United States Patent
Polly et al.

(10) Patent No.: US 11,035,715 B2
(45) Date of Patent: Jun. 15, 2021

(54) DEVICES, SYSTEMS AND METHODS FOR WIRELESSLY MONITORING LIQUID STORAGE CONTAINERS

(71) Applicant: Chevron U.S.A. Inc., San Ramon, CA (US)

(72) Inventors: Jonathan Reid Polly, Bakersfield, CA (US); Frederick H. Smith, Bakersfield, CA (US); Randall Evan Kravitz, Bakersfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 78 days.

(21) Appl. No.: 16/260,219

(22) Filed: Jan. 29, 2019

(65) Prior Publication Data
US 2020/0240827 A1 Jul. 30, 2020

(51) Int. Cl.
*G01F 23/296* (2006.01)
*G01F 25/00* (2006.01)

(52) U.S. Cl.
CPC ...... *G01F 23/2962* (2013.01); *G01F 25/0061* (2013.01)

(58) Field of Classification Search
CPC ............... C12Q 1/6827; C12Q 1/6886; C12Q 2600/156; G01F 23/2962; G01F 25/0061; G16H 10/40; G16H 20/10; G16H 50/20
See application file for complete search history.

(56) References Cited

U.S. PATENT DOCUMENTS

| 4,551,719 A | * | 11/1985 | Carlin | B67D 7/32 340/3.32 |
| 5,996,407 A | * | 12/1999 | Hewitt | G01F 22/00 73/290 V |
| 7,255,002 B2 | * | 8/2007 | Gravel | G01F 23/284 73/290 R |
| 9,506,798 B2 | | 11/2016 | Saltzgiver et al. | |
| 2006/0005621 A1 | * | 1/2006 | Lenk | G01F 23/284 73/290 V |
| 2006/0201245 A1 | * | 9/2006 | Huber | G01F 23/2962 73/290 R |
| 2007/0209434 A1 | * | 9/2007 | Peters | G01F 25/0061 73/290 V |
| 2007/0261487 A1 | * | 11/2007 | Sintes | G01F 23/2962 73/290 V |

(Continued)

FOREIGN PATENT DOCUMENTS

CN 107872536 A 4/2018

*Primary Examiner* — Francis C Gray
(74) *Attorney, Agent, or Firm* — Jason M. Guerrero

(57) ABSTRACT

Devices for sealing chemical totes and wirelessly monitoring chemicals in the totes include sensors for obtaining data from within the totes and transceivers for receiving and transmitting the data. The data is received from the sensor and transmitted to a gateway transceiver located at a remote location on a low-power wide-area network. Data can be aggregated from multiple devices and relayed to a server on the network. An integrated microcontroller is programmed with instructions for coordinating communications to and from the device transceiver. Systems can include multiple containers located up to 25 miles from one another using the device. Methods including wirelessly monitoring chemicals in chemical totes are disclosed. Data obtained using the device can be used in a variety of ways.

31 Claims, 11 Drawing Sheets

(56) References Cited

U.S. PATENT DOCUMENTS

| | | | |
|---|---|---|---|
| 2008/0236275 A1* | 10/2008 | Breed | B60N 2/2806 |
| | | | 73/290 V |
| 2013/0054159 A1* | 2/2013 | Pennebaker | G08C 17/02 |
| | | | 702/55 |
| 2016/0025545 A1 | 1/2016 | Saltzgiver et al. | |

* cited by examiner

DEVICES, SYSTEMS AND METHODS FOR WIRELESSLY MONITORING LIQUID STORAGE CONTAINERS

FIELD

The present disclosure relates to devices, systems and methods for wirelessly monitoring liquid storage containers used for storing liquid chemicals, particularly liquid storage tanks and totes located across a wide area.

BACKGROUND

Containers such as chemical totes are commonly used for storing liquid chemicals in field sites in various industries including agriculture and oil and gas. The field site can be a plant site, a remote wellsite, an industrial farming site, and the like. A given field site may have any number of chemical totes. In some cases, a field site has over 100, over 1000 or even over 10,000 chemical totes. Common chemical dosing applications in the field that rely on chemical totes for storage include injection of emulsifiers into flow lines to help reduce the viscosity of crude oil flowing from a wellhead to prevent plugging, descaling of downhole mineral deposits on wellbores, and separation of fluids in plants. Such chemical totes, also referred to herein as tanks, can contain several hundred to thousands of gallons of valuable chemical resources.

Such chemical totes are currently manually inspected by operators. For instance, at a given field site, operators may drive across hundreds of square miles on a weekly basis to inspect the levels of the chemical totes using a dipstick or a mark on the tote. The volumes in the chemical totes are recorded and used to calculate a consumption rate for the totes at the site. Additionally, when a chemical tote runs empty, plugging can occur resulting in lost production or overdosing which wastes valuable chemicals. Given the general low consequence, non-hazardous nature of these liquids and the complex requirements to place these totes in a process control network (PCN), the instrumentation of these totes has historically been cost prohibitive. Field personnel routinely, e.g., weekly, drive across hundreds of square miles to manually inspect the tank levels using dip-stick measurement or manually drawn hash marks and then record the volumes to derive the consumption rate for thousands of tanks.

There are several undesired results from the current manual inspection of chemical totes. One result is that plugging occurs frequently when a chemical tank runs empty, causing lost production or the problem of overdosing which wastes valuable chemicals. Another result is the cost of sending personnel in vehicles to manually inspect thousands of tanks each week. Another result is the lack of visibility into the chemical supply chain at a high-level since the need to refill chemical totes is being monitored and managed locally and manually. For instance, a given field site may have a spreadsheet that personnel manually enter fluid levels into.

Attempts have been made to automate such chemical totes using submerged pressure monitors connected to pump off controllers. These pressure monitors are complex to install, use proprietary IT systems and often malfunction. As a result, this has proven to be an ineffective solution.

There exists a need for efficient and value adding devices, methods and systems for monitoring containers such as chemical totes over a large area that would avoid the aforementioned problems with the current methods.

SUMMARY

In one aspect, a device for wirelessly monitoring a container used for liquid storage is provided. The device includes a lid configured to seal an opening of the container; a sensor integrated with the lid for obtaining data from the container; a lid transceiver integrated with the lid for receiving the data from the sensor and transmitting the data to a first gateway transceiver located at a remote location for aggregating data from multiple lid transceivers and relaying the aggregated data to a server on a low-power wide-area network in one or more packets. The lid transceiver and the first gateway transceiver are configured to communicate over the low-power wide-area network using a radio frequency spectrum of from 30 to 300,000 MHz. The device also includes a microcontroller integrated with the lid programmed with instructions for coordinating communications to and/or from the lid transceiver; and a source of power integrated with the lid for powering the sensor, the lid transceiver and the microcontroller.

In another aspect, a system for wirelessly monitoring a plurality of containers used for liquid storage is provided. The system includes multiple containers located within a distance from one another of up to 25 miles. Each of the containers has the device described above configured to seal the opening of the container. A first gateway transceiver is located at a remote location for aggregating data from multiple lid transceivers of the plurality of lid transceivers and relaying the aggregated data to a server on a low-power wide-area network in one or more packets. The system also includes the low-power wide-area network over which the lid transceivers and the first gateway transceiver are configured to communicate with one another.

In another aspect, a method for wirelessly monitoring a container used for liquid storage is provided. The method includes sealing an opening in a wall of the container with the device described above. The method further includes obtaining data from the container using the sensor of the device; receiving the data from the sensor using the lid transceiver; and receiving the data from the lid transceiver using the first gateway transceiver located at the remote location.

In yet another aspect, a method is provided for retrofitting a container used for liquid storage to enable monitoring of the container. The method includes replacing a standard lid for sealing an opening of the container comprising no transceiver with the device described above and configured to seal the opening of the container.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

FIG. 8 is a screenshot of a real-time dashboard view in a web portal displaying data obtained using one exemplary embodiment.

FIG. 9 is a screenshot of a real-time dashboard view in a web portal displaying data obtained using one exemplary embodiment.

DETAILED DESCRIPTION

Figure 1:
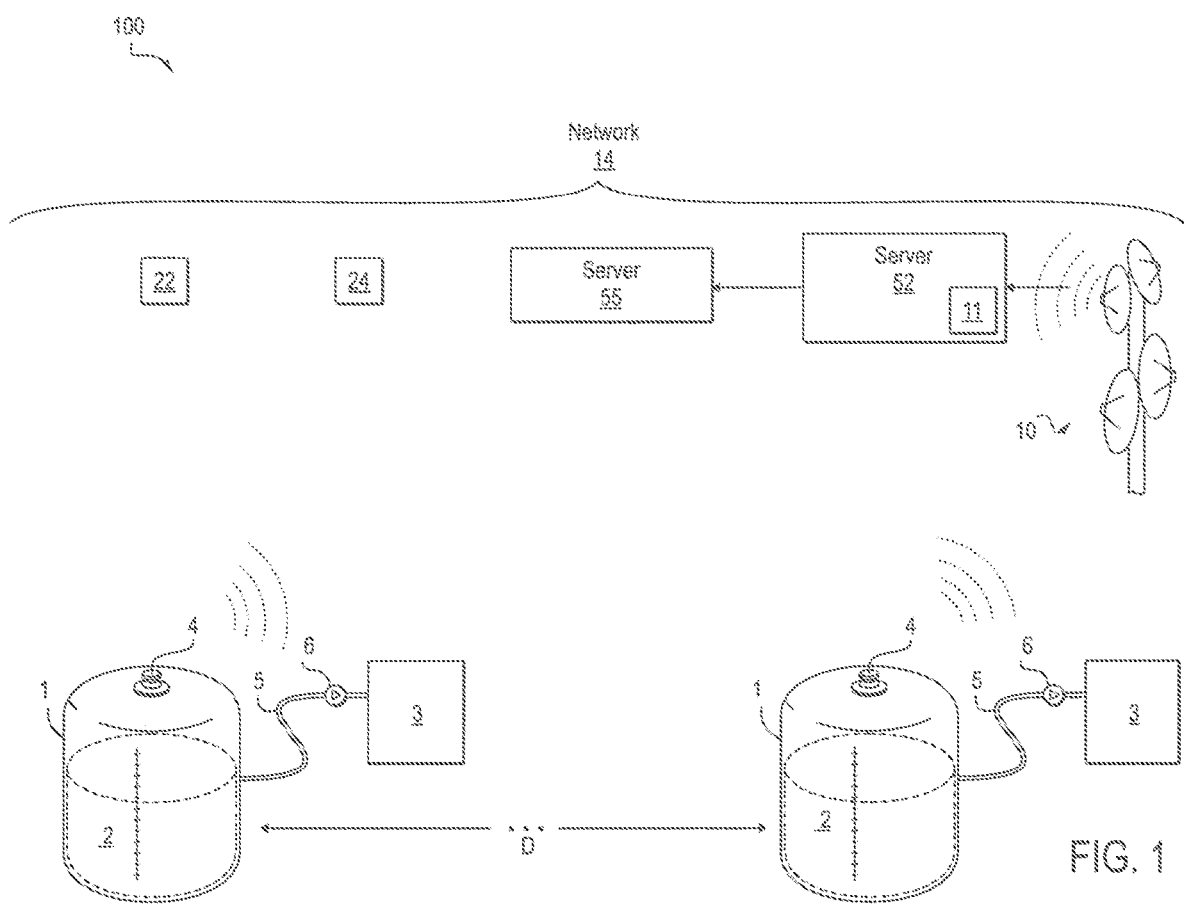
FIG. 1 is a simplified diagram of a field system in which example embodiments can be applied.

Systems, devices and methods for monitoring containers will now be described with reference to the figures. Referring to FIG. 1, shown is a system 100 for monitoring containers also referred to as chemical totes 1 containing liquid chemicals 2 according to one embodiment. As defined herein, "chemical tote" refers to any storage container or tank for containing liquid chemicals. Such totes are commonly used not only to store liquid chemicals but also to connect to a pump (or dosing device) 6 so that the chemicals can be injected into a target piece of equipment 3 for use in a process or system that utilizes the liquid chemical 2. The totes 1 can be connected to the pump 6 or even directly to the equipment 3 by way of a fluid conduit such as a hose 5. The pumps are commonly configured to run continuously or intermittently, sometimes as controlled by a local pump controller (not shown).

The chemical totes 1 can have any suitable capacity depending on the process or system that utilizes the liquid chemical 2, e.g., from 0.5 to 1000 gallons. The chemical totes 1 can be made from a lightweight, durable material such as high density polyethylene, or other durable polymer, or a metal such as carbon steel or stainless steel. Chemical totes 1 have a top opening with a lid 4 configured to seal the opening. The lid 4 can be threaded or can snap on. The lid 4 can be made from plastic, metal or a combination of plastic and metal.

In one embodiment, several up to many chemical totes 1 are located a distance of from 3-5 miles, up to 10 miles, and even up to 25 miles from one another, as varies by conditions. For instance, the system 100 can include two chemical totes 1 as shown, even tens of chemical totes 1, even hundreds of chemical totes 1 and even thousands of chemical totes 1.

In one embodiment, the system is intrinsically safe. By intrinsically safe is meant that the system is made up of components and materials that protect against ignition or combustion of Division 1, Class I materials (e.g., flammable gases, flammable liquids-produced vapors or combustible liquid produced vapors) that may be present in the vicinity of the system 100. For example, the lid 4 can be intrinsically safe. In one embodiment, the lid 4 can be IP (Ingress Protection) rated according to the requirements of standards EN 60529 (European IEC 60509:1989) or NEMA (see NEMA Standards Publication 250-2003, "Enclosures for Electrical Equipment (1000 Volts Maximum)" published by National Electrical Manufacturers Association) which define levels of sealing effectiveness of electrical enclosures against intrusion from foreign bodies such as dust and moisture. In one embodiment, the lid 4 meets the requirements of IP67 rated enclosures or NEMA Type 4X enclosures, meaning that the lid 4 is resistant to the penetration of dust and moisture under certain testing conditions. Other standards to ensure safe reliable operation may also be applicable and thus desirable to meet, as would be understood by one of ordinary skill in the art.

Figure 2:
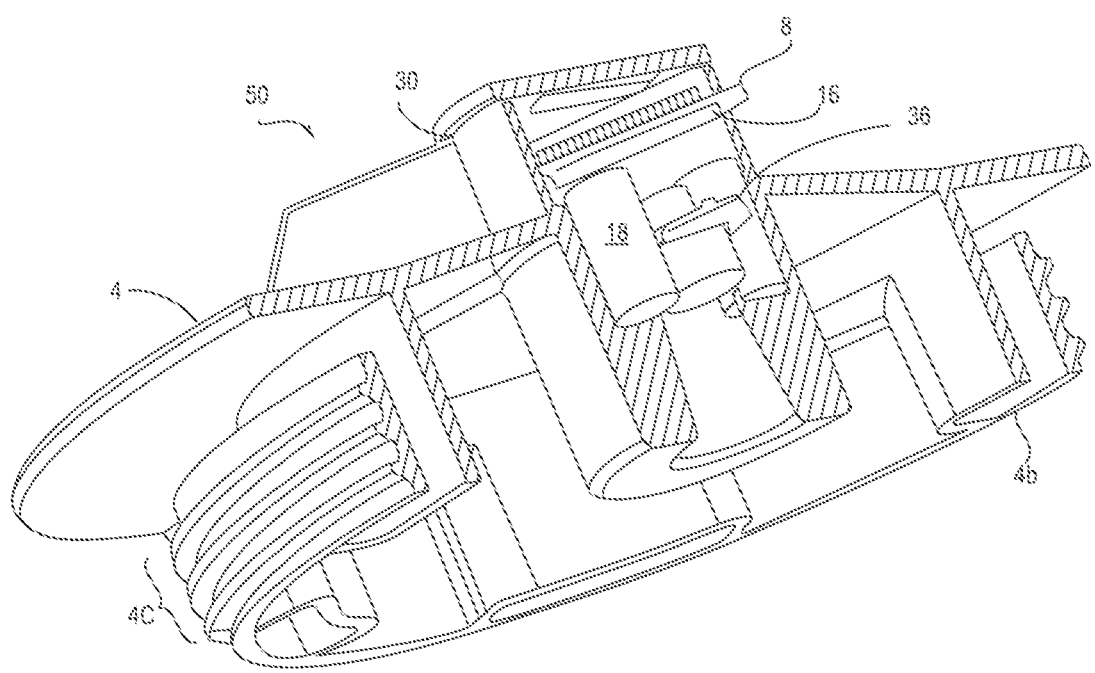
FIG. 2 is an perspective cutaway view of a device according to one exemplary embodiment.

FIG. 2 is a perspective view of a device 50 according to one nonlimiting exemplary embodiment. A sensor 36 is integrated with the lid 4. By "integrated" is meant that the sensor 36 can be built into or connected to the lid 4. The sensor 36 can be any sensor for obtaining data of interest, such as a property of the liquid chemical 2 within the chemical tote 1. In one embodiment, the sensor 36 is a noncontact ultrasonic type sensor that uses ultrasonic waves to measure the distance to its target by measuring the time between emission and reception of ultrasonic waves. The noncontact ultrasonic sensor 36 emits ultrasonic waves from the lid 4 towards the liquid chemical 2 and receives the waves reflected back from the surface of the liquid chemical 2. The distance from the sensor to the liquid level is determined as: ½×the time between the emission and reception×the speed of sound. From the distance that the ultrasonic waves travel, the level of the liquid chemical 2 in the chemical tote 1 can be determined by subtracting this distance from the height of the chemical tote 1. In some embodiments, the sensor 36 can be a humidity sensor for measuring humidity, a temperature sensor for measuring temperature, a sensor for detecting GPS coordinates, or an accelerometer for detecting a position, orientation or movement of the lid 4. Combinations of multiple sensors 36 may be used on a given lid 4.

Figure 3:
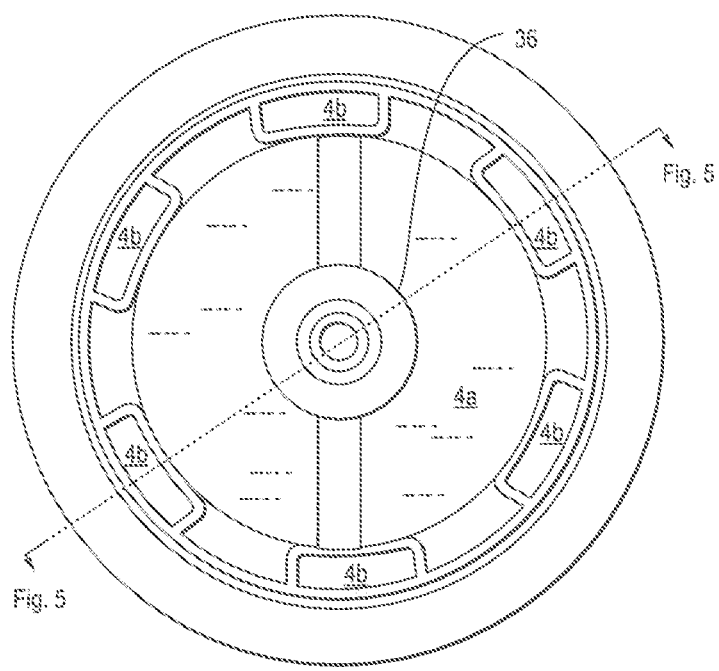
FIG. 3 is a bottom view of a device according to one exemplary embodiment.

FIG. 3 is a bottom view of the lid 4 showing an optional corrosion resistant coating 4a thereon as needed depending on the corrosivity of the chemicals in the tote. In one embodiment, the lid 4 can have an optional vent 4b for allowing gas to escape from the chemical tote 1 and to prevent a vacuum. As can be seen in FIG. 2, the lid 4 can conveniently have optional threads 4c to allow the lid 4 to be screwed onto the body of the chemical tote 1.

In one embodiment, referring to FIG. 2, a lid transceiver 8 is integrated with the lid 4 for receiving the data from the sensor 36 and transmitting the data to a gateway transceiver 10 located at a remote location (as shown in FIG. 1). In one embodiment, the gateway transceiver 10 can be located a distance of from 3-5 miles, up to 10 miles, and even up to 25 miles from the totes 1. The lid transceiver 8 can be on a printed circuit board and configured to transmit data to the gateway transceiver 10 as frequently as desired. For example, the data can be transmitted from the lid transceiver 8 to the gateway transceiver 10 once per day, e.g., multiple times per day up to several times per hour.

As shown in FIG. 1, the data received by the gateway transceiver 10 can be stored in a timeseries data store 11 (e.g., on a server 52) for access at a later time by a user. In one embodiment, the user can access the timeseries data store 11, e.g., to determine when to refill the chemical tote 1, and in some embodiments, to schedule ordering the liquid 2 to refill the chemical tote 1.

The gateway transceiver 10 and the lid transceiver 8 in the device 50 form a low-power wide-area network 14 (shown in FIG. 1). The gateway transceiver 10 can relay the over-the-radio interaction with the lid transceiver 8 and exchanges relayed data to and from devices. Put another way, the gateway transceiver 10 receives, processes and/or forwards wireless packets across the low-power wide-area network 14. Data can be relayed between the lid transceivers 8 for aggregation over the low-power wide-area network 14. Furthermore, the lid transceivers 8 and the gateway transceiver 10 are configured to communicate with one another over the network 14. As defined herein, "long range low power wide-area network" refers to any low-power wide-area network (WAN) using an unlicensed or licensed radio frequency spectrum. The low-power wide-area network 14 can use an industrial or scientific radio spectrum, e.g., the Industrial, Scientific and Medical (ISM) band. In one embodiment, low-power wide-area network uses a radio frequency spectrum of from 300 to 3000 MHz. The low-power wide-area network 14 can have a data rate of from 0.3 kbit/s to 50 kbit/s per channel. The low-power wide-area network 14 can have a wireless range of up to 25 miles, e.g., up to 5 miles, up to 10 miles (line of sight). As defined herein, "wireless packet," "data packet," and simply "packet" are used to refer to a singular unit of information that can be transmitted wirelessly on a network. All information that is transmitted wirelessly on a network is transmitted in the form of one or more packets.

One suitable, nonlimiting, example of a low-power wide-area network 14 is LoRaWAN. LoRaWAN is the network on which LoRa operates. LoRa is a digital wireless data communication technology as described in U.S. Pat. No. 7,791,415 B2 (Hornbuckle). LoRa is a non-cellular LPWAN wireless communication network protocol, operating in the license-free spectrum. LoRa uses license-free sub-gigahertz radio frequency bands such as, for example, 169 MHz, 433 MHz, 868 MHz (Europe) and 915 MHz (North America). LoRa enables communications up to over 10 km with low power consumption. The technology is partitioned into LoRa, a physical layer, and LoRaWAN (Long Range Wide Area Network), upper layers. LoRaWAN is a protocol for managing communication between low-power wide-area gateways and devices 50 as a routing protocol maintained by the nonprofit alliance LoRa Alliance™ (Fremont, Calif.). LoRaWAN defines the communication protocol and system architecture for the network, while the LoRa physical layer enables the long-range communication link. LoRaWAN manages the communication frequencies, data rate, and power for all devices 50, more specifically, the lid transceivers 8 of devices 50. Symphony Link™, another open source communication protocol defined by a company called Link Labs Inc. (Annapolis, Md.), can be used as the communication layer.

LoRa technology advantageously provides long period autonomous operation, radio ranges that do not require a mesh architecture to achieve long distances, and interference immunity that makes operations in unlicensed bands practical. In some embodiments, LoRa is not used. Alternative suitable radio-based technologies that may be used in place of LoRa include, but are not limited to, standard cellular network technology, Narrowband IoT (NB-IoT) network technology (developed by The 3rd Generation Partnership Project), Sigfox network technology developed by Sigfox Inc. (Labege, France), LTE Cat-M1 network technology, Zigbee network technology and JupiterMesh™ (both developed by Zigbee Alliance, Davis, Calif.), RPMA® (Random Phase Multiple Access) wireless technology developed by Ingenu Inc. (San Diego, Calif.), and Weightless-P developed by The Weightless SIG (Special Interest Group). In some embodiments, the network architecture has a star-of-stars topology. In other embodiments, the network architecture has a mesh topology. Other topologies may be suitable.

In one embodiment, the lid transceivers 8 are asynchronous and transmit data from the devices 50 when they have data available to send. Data transmitted by a device 50 can be received by multiple gateway transceivers 10, which can forward data packets to a network server 52. The network server 52 can be configured to filter duplicate data packets, perform security checks, and manage the network 14. Data can then be forwarded to other application servers 55 for further data processing and use as desired.

The lid transceiver 8 and the gateway transceiver 10 are configured to communicate with one another over the low-power wide-area network 14. The lid transceiver 8 and the gateway transceiver 10 can be configured to communicate using a spectrum in the very high frequency (VHF), i.e., 30-300 MHz, ultra high frequency (UHF), i.e., 300-3000 MHz, super high frequency (SHF), i.e., 3000-30,000 MHz, or extra high-frequency (EHF), i.e., 30,000-300,000 MHz range. The lid transceiver 8 and the gateway transceiver 10 can be configured to use spread spectrum techniques to enable recovery of the data at low signal levels and in the presence of noise.

In one embodiment, a microcontroller 16 is integrated with the lid 4 and is programmed with instructions for controlling the sensor(s) 36 and coordinating communications with the lid transceiver 8. The microcontroller 16 integrates natively with a cloud-based web service, such that the interaction of the microcontroller 16 and the cloud-based web service is supported and managed as a real-time operating system (RTOS), for example, eliminating the requirement to write lower level code. In this way, provision is made for direct (or indirect via gateway) secure transmission to cloud service endpoints. In one embodiment, the microcontroller 16 enables over the air (OTA), also referred to as over-the-radio, firmware updates over the low-power wide-area network 14, thereby enabling remote support and maintenance including the ability to add additional software capability as it is developed. Device logic can be updated remotely from a central console in order to correct bugs, add functionality and control action on the device 50. Administrative commands such as shadow updates, OTA firmware deployments, key rotations, and the like can be deployed from a cloud-based control console to the lid 4. Alternatively, a Bluetooth interface can be used. For instance, when the network server is not available, the device 50 can be controlled locally from a mobile device using Bluetooth technology. Off-line updates on the device 50 can be administered using a handheld mobile device and a NFC/Bluetooth paired combination.

In one embodiment, the microcontroller 16 receives at least one packet from the gateway transceiver 10 that conveys instructions to the lid transceiver 8 to actively control the device 50. For example, in one embodiment, shown in FIG. 2, an optional visual indicator 30 can be provided on the lid 4 such as an LED light ring 30 which can be turned on to alert operators in close proximity to the device 50 of a condition that requires attention.

In one embodiment, the sensor 36 includes an ultrasonic sensor. In one embodiment, in response to instructions received by the lid transceiver 8 from the gateway transceiver 10, the ultrasonic sensor 36 can be shifted from an ultrasonic frequency to an audible frequency perceptible by human operators. In one embodiment, when a condition that requires attention has been identified, the frequency can be shifted to the audible range and an audible notification can be emitted from the sensor 36 to communicate with operators in close proximity to the device 50.

Figure 5:
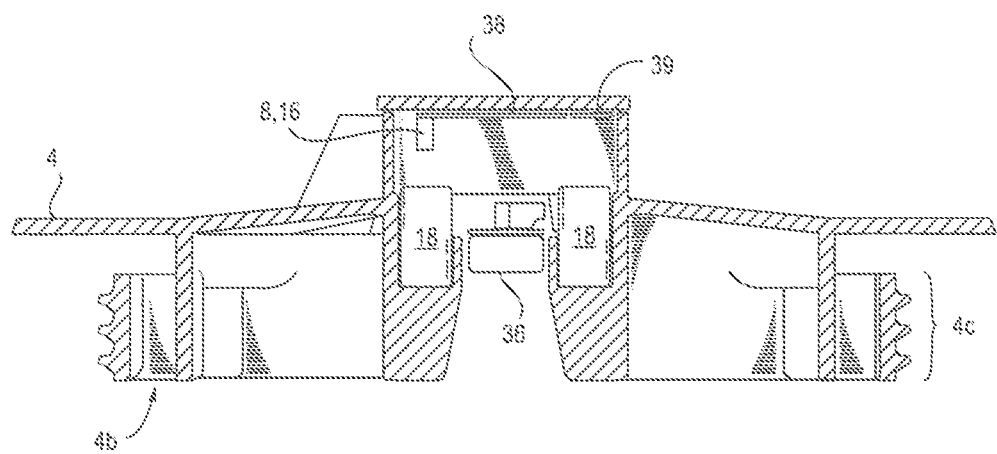
FIG. 5 is a cutaway side view of a device according to one exemplary embodiment.

In one embodiment, referring to FIG. 5, the device 50 can include an integrated magnetic switch 38 that can be used for resetting the device 50, i.e., turning the power on or off, or for executing a join request for joining the device 50 to the network 14. An external magnet (not shown) can be used by an operator by passing the external magnet in the vicinity of the integrated magnetic switch 38 without opening the lid 4. Alternatively, a Bluetooth interface can be used. In one embodiment, an NFC system can be paired with Bluetooth, utilizing power from a mobile device. The NFC/Bluetooth combination can be used for resetting the device or executing a join request.

In one embodiment, the device 50 can include an integrated antenna 39 connected to the lid transceiver 8 for improving transmission and reception by the lid transceiver 8. In one embodiment, the antenna is a piece of wire. In other embodiments, the antenna is built into the lid transceiver 8. It is to be understood that an antenna is either built into the transceiver 8 or connected as an external antenna 39.

In one embodiment, the microcontroller 16 is an agent operating on the edge of the control plane for remote administration and management of a fleet of multiples devices 50 on behalf of the control plane. One nonlimiting example of a suitable microcontroller 16 is an ESP32 microcontroller which integrates natively with the Amazon Web Services (AWS) cloud via an embedded AWS Real Time Operating System (AWS FreeRTOS) (Amazon Web Services, Inc., Seattle, Wash.). AWS FreeRTOS supports internet of things (IoT) capabilities and handles basic utility functions such as bulk device onboarding, OTA firmware updates, shadow states, end-to-end encryption, certificate rotation, security monitoring, device status monitoring and the like as would be apparent to the skilled artisan. A user of the disclosed system, e.g., a petroleum engineer, programs the specific logic for the particular chemical monitoring task. For instance, this may include but is not limited to level monitoring, temperature monitoring, battery monitoring, network monitoring, state monitoring, accelerometer monitoring to detect movement of the lid, for refilling of the tote, tampering and the like. Advantageously, such capabilities allow for the deployment of thousands of devices 50 in remote locations. Data can be transmitted from outside of a process control network (PCN) directly to cloud computing service providers such as AWS and Microsoft Azure Cloud Services (Microsoft Inc., Seattle, Wash.) for low consequence data flows, meaning data that does not require high levels of protection. In one embodiment, data is communicated in the form of MQTT (Message Queuing Telemetry Transport). MQTT is an ISO standard (ISO/IEC PRF 20922) publish-subscribe-based messaging protocol that works on top of the TCP/IP protocol. Raw MQTT messages can be brokered to subscribing applications where tank telemetry can be viewed, analyzed, and acted upon.

Figure 6:
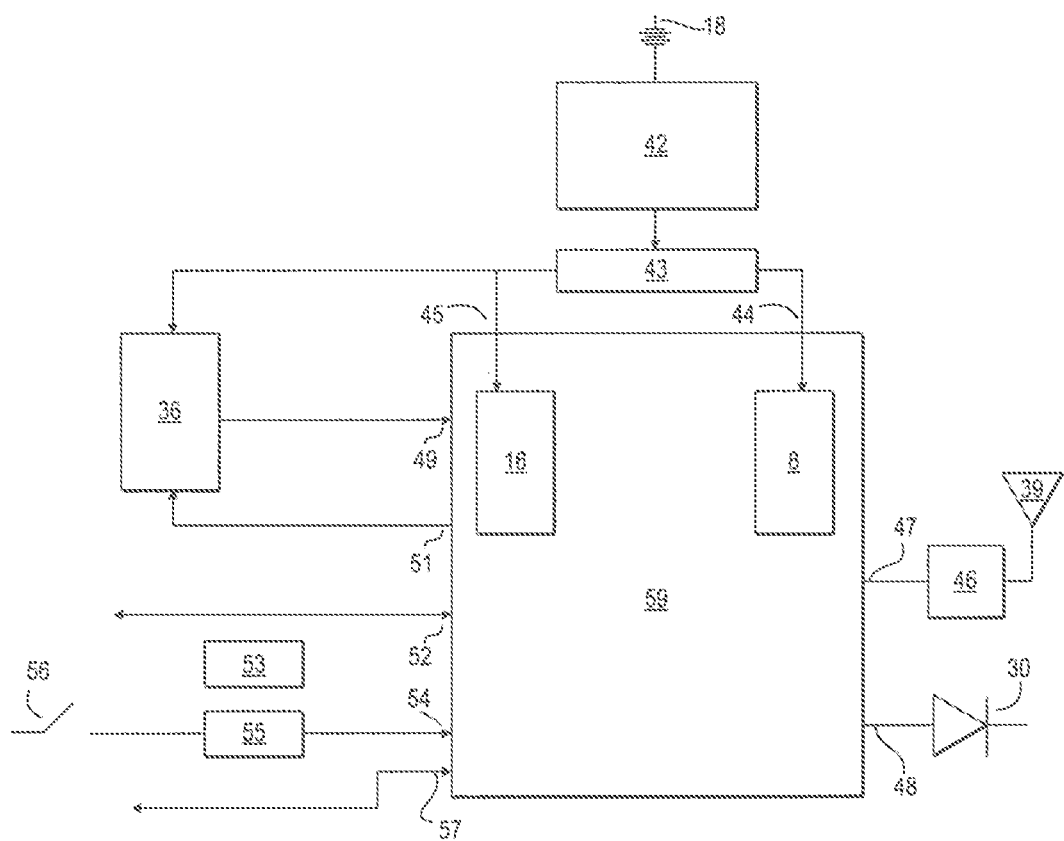
FIG. 6 is a block diagram illustrating a system according to one embodiment.

Referring to FIG. 6, shown is a simplified schematic view of the microcontroller 16 integrated on a printed circuit board 59 with the lid transceiver 8 according to one example. The printed circuit board 59 is powered by a battery 18. A low-power switch 42 can be provided which includes a low-voltage sensor and a field effect transistor switch such that the power to the microcontroller 16/lid transceiver 8 is turned off when the battery voltage is low. A low-pass filter/high-frequency isolation filter 43 is provided to allow power to be provided separately as shown to the microcontroller 16 and the lid transceiver 8 and to filter out noise. Power to the lid transceiver 8 is provided through an input port 44. Power to the microcontroller 16 is provided through input port 45. Main control unit power is passed from the low-pass filter 43 to the level sensor 36. Data from the level sensor 36 is transmitted to the microcontroller 16/lid transceiver 8 by way of a bus 49, such as, for example, a I²C bus. Input/output port 51 is provided to turn on the sensor 36 momentarily to take a reading and turn off to save power. An input/output port 52 is provided to allow programming. Surge protector 53 protects port 52. An input/output port 54 is provided to connect to de-bounce networks 55 and physical switches 56 as may be needed. A debug port 57 can be provided as may be needed for programming functions. An input/output port 47 can be provided to connect with a radiofrequency low-pass filter 46 that is in turn connected with the antenna 39. The low-pass filter 46 can be used to ensure that data in the ISM band is transmitted. Optionally, an input/output port 48 can be provided to connect to LED lights 30. Although not shown in FIG. 6, additional components can be provided to bring additional functionality. For instance, additional input/output ports can be provided to connect with a GPS, an accelerometer, a Bluetooth, a near field communication system (NFC) and the like.

Figure 4:
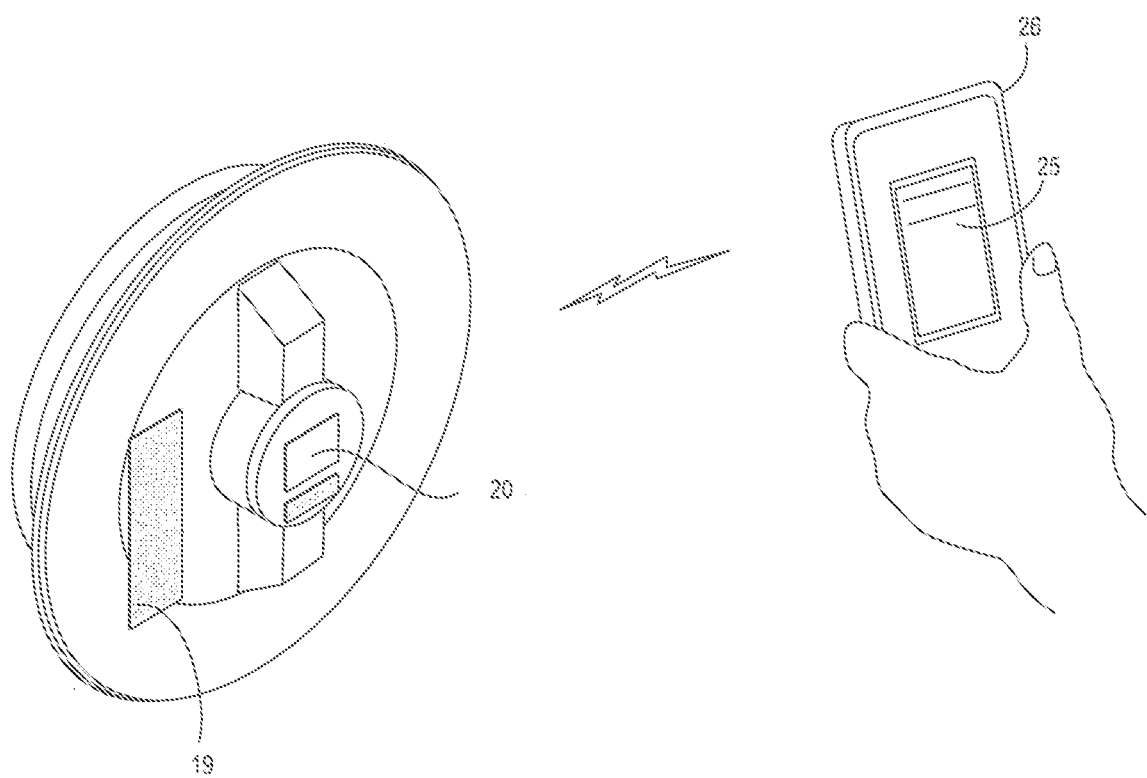
FIG. 4 is a top perspective view of a device according to one exemplary embodiment.

A source of power can be integrated with the lid 4 for powering the sensor 36, the lid transceiver 8 and the microcontroller 16. In some embodiments, the source of power is at least one battery 18 connected to the sensor 36, the lid transceiver 8 and/or the microcontroller 16. In some embodiments, as shown in FIG. 4, the source of power is at least one solar panel 19 connected to the sensor 36, the lid transceiver 8 and/or the microcontroller 16. In some embodiments, the device 50 can be connected to an external source of power (not shown).

In one embodiment, shown in FIG. 4, a scannable label 20 can be attached to the device 50. The scannable label 20 can contain device identifying information such that when the label is scanned by a scanner such as a QR scanner, the device identifying information can be transmitted to a mobile companion app. The device identifying information can be recorded on the companion mobile device and later synchronized with the network server 52 over a cellular connection onboard the device 50. The scannable label 20 can be a quick response (QR) code label, a radio frequency identification (RFID) tag, a barcode label or the like. The device identifying information can include the GPS coordinates of the device 50. The device 50 includes the lid 4 and the sensor 36, lid transceiver 8, microcontroller 16 and source of power 18 associated therewith. The device identifying information can include the dimensions of the chemical tote 1. Alternatively or in addition to the scannable label 20, an NFC system can be provided. The NFC system can be programmed such that when a handheld mobile device is held near the lid 4, device identifying information is transmitted to a server over the network 14.

In one embodiment, shown in FIG. 1, optional additional gateway transceivers 22 and 24 are used to receive the data from the lid transceiver 8 of each device 50. In this embodiment, the gateway transceiver 10 and the additional gateway transceivers 22 and 24 have known, fixed locations and communicate with each other over the low-power wide-area network 14. The 3 gateway transceivers 10, 22 and 24 (at least three) determine the location of the lid transceiver 8 by triangulation as calculated by the network server 52. Time difference of arrival (TDOA) or received signal strength indication (RSSI) can be used as the method for geolocation determination. In this way, each device 50 does not need to include a sensor for detecting GPS coordinates for the system 100 to be able to locate each device 50.

In one embodiment, the device 50 on a chemical tote 1 can be replaced easily if needed. If, for any reason, the performance of a device 50 is inadequate, the device can be removed from the chemical tote 1 and a second device 50 configured like the device to be replaced is installed in its place. Again referring to FIG. 4, the scannable label 20 of the device 50 to be replaced containing device identifying information can be scanned and the device can be deactivated using a mobile device application 25 on a mobile device 26. The second device 50 can be provided with a scannable label 20 which is scanned to activate the second device using the mobile device application 25. The opening in the wall of the chemical tote 1 is sealed with the second device 50. In like manner, in one embodiment, a conventional system in which standard lids are used for sealing chemical totes, the chemical totes can be retrofitted to enable monitoring of the chemical totes by replacing the standard lid with the device 50 configured to seal the opening of the tote 1.

Advantages of chemical tote monitoring system and method embodiments disclosed herein include lower cost than conventional systems and coverage over a distance of several miles, e.g., 1-5 miles, 3-5 miles, at least 5 miles, up to 10 miles, and even up to 25 miles (line of sight). System embodiments disclosed herein last for multiple years of service, e.g., at least 5 years, on commodity batteries. The chemical supply chain for a field site can be optimized, thus reducing the annual chemical spend, e.g., from 5 to 10% vs. the current, manually intensive conventional systems. In one embodiment, alerts are generated when tanks run low before an empty tank or plugging occurs. Lost production can thus also be reduced by avoiding such occurrences. Maintenance of the chemical totes 1 can be dramatically reduced or simplified. An operator can simply replace a lid 4 and pair it to the network 14 with a mobile application 25 by scanning a QR code on a label 20 rather than manually troubleshoot a malfunctioning lid. These embodiments can further enable chemical supply chain transparency and optimization, automated delivery scheduling and routing, and automating procurement processes.

Figure 7:
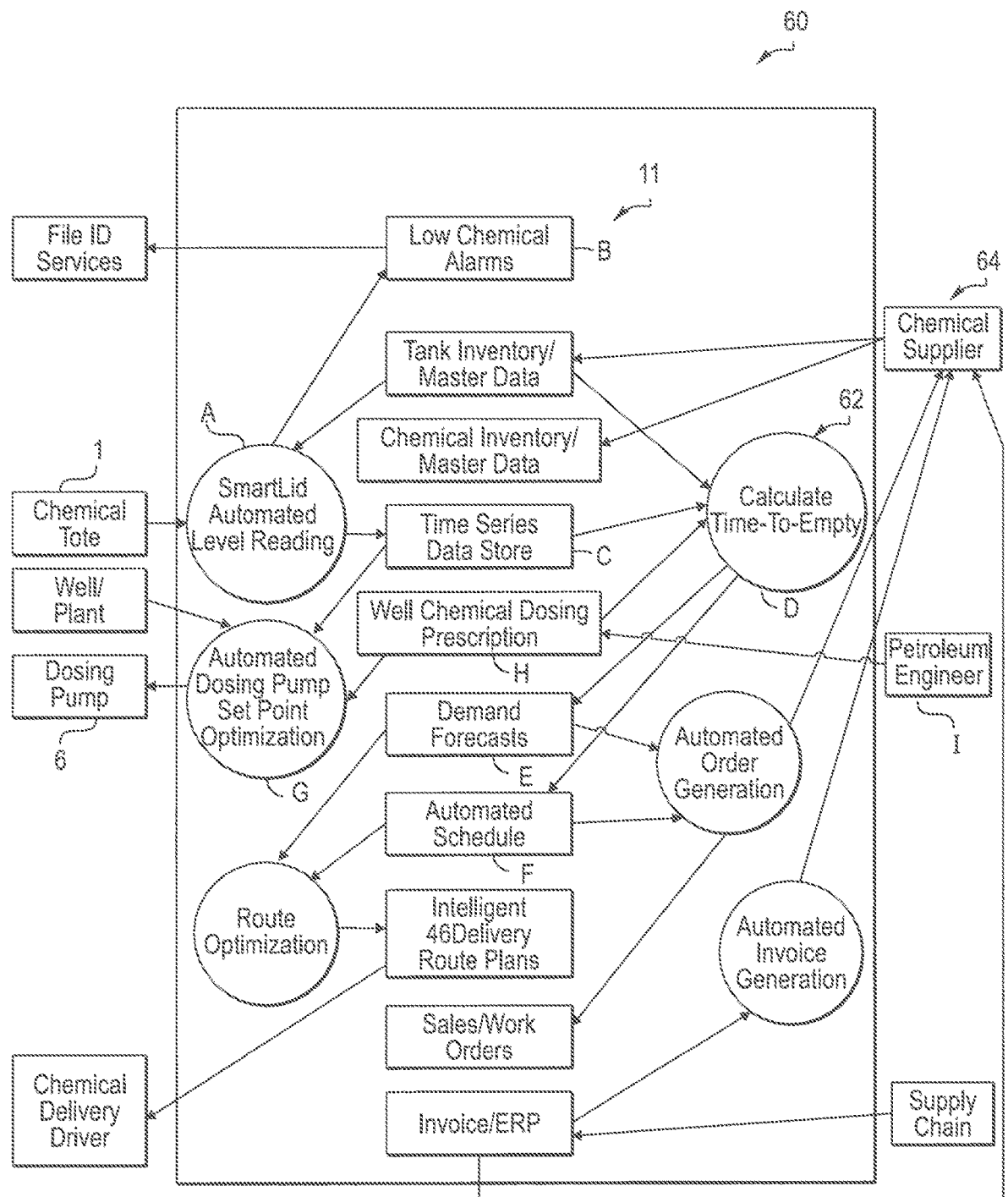
FIG. 7 is a simplified data flow diagram for a chemical management process according to one embodiment.

FIG. 7 is a simplified data flow map 60 for a chemical management process utilizing embodiments disclosed herein. In the data flow shown, ten timeseries data stores represented by blocks 11 (e.g., stored on a server 52) are used in the chemical management process. Data from the data stores 11 are used in six processes represented by circles 62. Eight external entities 64 interact with the processes 62 and the data stores 11. The external entities are represented by blocks 64 outside the data flow map 60. The data flow diagram highlights the capabilities enabled by the devices, systems and methods disclosed herein. The data flow is initiated by the level monitoring of chemical tote 1 that occurs at process A. As can be seen in the data flow, the level data obtained at point A may be used to generate a low chemical alarm directly (data store B) or may be sent to a timeseries data store (data store C). Data from this timeseries data store can be used, for example, to calculate the time until the tote is empty (process D). Time to empty information can be sent to a demand forecast (data store E) or an automated schedule (data store F). Also as can be seen in the data flow, the dosing pump 6 can be controlled by a dosing pump setpoint optimization process G using information obtained from data stores such as data store C and a well chemical dosing prescription data store H using information provided by a petroleum engineer I. Other nonlimiting examples of uses for the data obtained from the chemical tote 1 are shown on the data flow map 60.

As can be seen, the embodiments disclosed herein advantageously enable the automation of a supply chain of chemicals 2 stored in containers 1. Manual inspection of the containers 1 can be eliminated.

EXAMPLES

A simple prototype of device 50 was assembled and demonstrated at a field site. A standard black plastic 8 in chemical tank lid 4 was modified by fitting a trash bin monitor sold under the trade name BrighterBins (available from SmartEnds, Inc., Ghent, Belgium) in the underside of the lid. The bin monitor had an ultrasonic level detection sensor 36, a non-rechargeable lithium battery 18 and a built-in transceiver 8. A vent 4b was added to the lid 4 prevent a vacuum being created in the tank 1 as fluid 2 is pumped out. The vent 4b had a 10 mm outer diameter and a 7 mm inner diameter with stainless steel fittings and a rubber bushing, and stainless steel tubing protruding from the top of the lid 4. The lid 4 was fitted to a 200 gallon tank 1 containing a corrosion inhibitor (CORR11447A, available from Nalco Champion, Ecolab, Inc., Saint Paul, Minn.) which was connected to a pump 6 for pumping into a wellbore. The sensor 36 measured the distance from the surface of the fluid 2 within the tank 1 to the sensor 36 at the top of the tank.

Once the lid was fitted to the tank, the lid device 50 was registered on a network 14 from a computer at a remote location. The transceiver 8 was registered on a network server 52 to communicate with a gateway transceiver 10 located in a tower at the field site. Six such lid devices 50 were activated and located in a range of 1.5 miles from a gateway transceiver 10 which reached the extent of the field location. A tower mounted omni directional LoRa antenna was used in the gateway transceiver 10.

Figure 8:
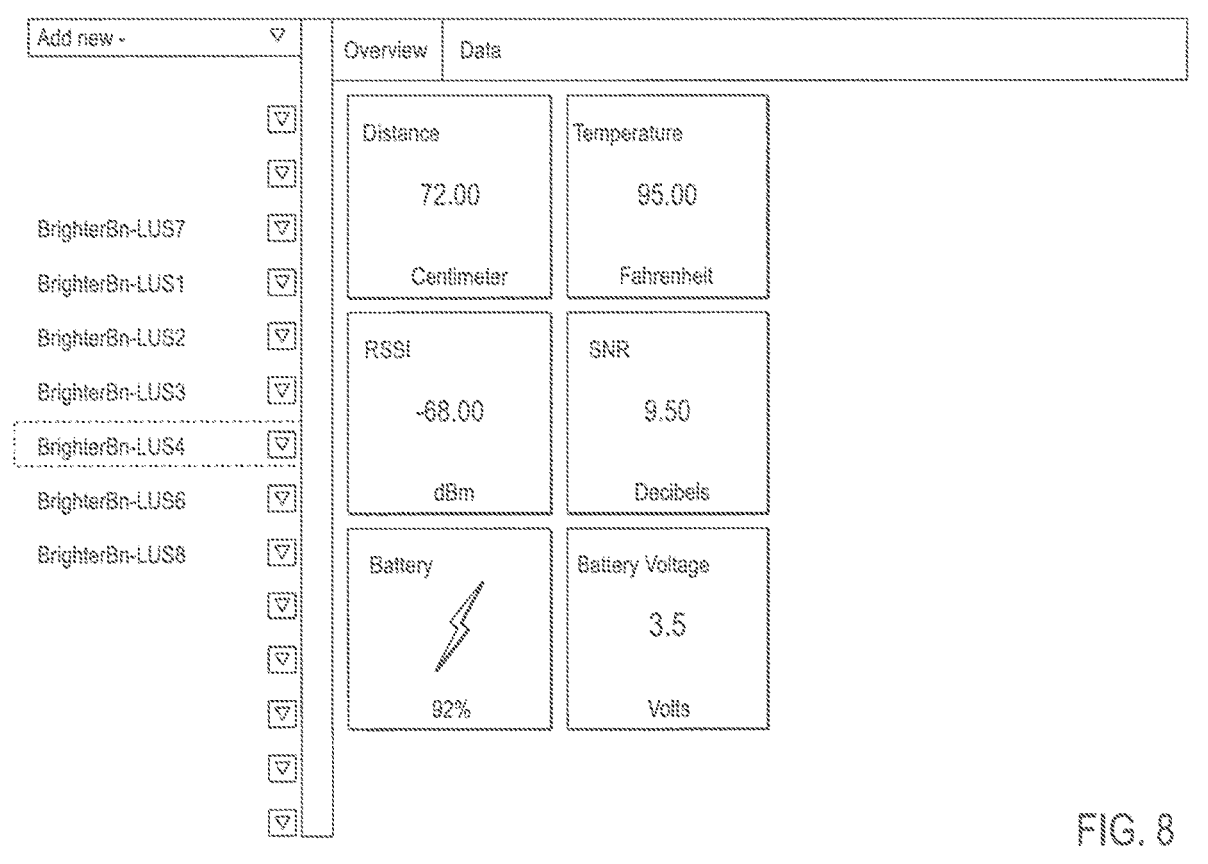
Figure 9:
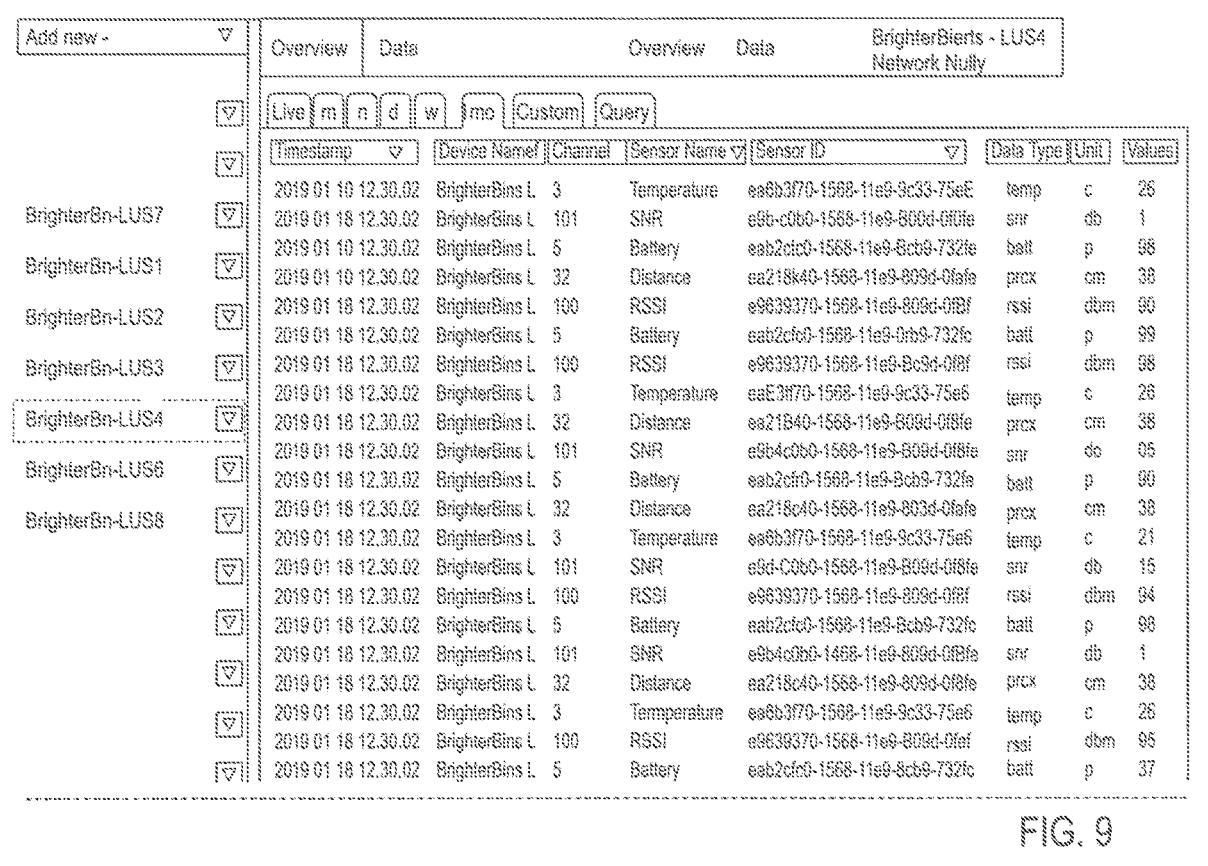
Figure 10:
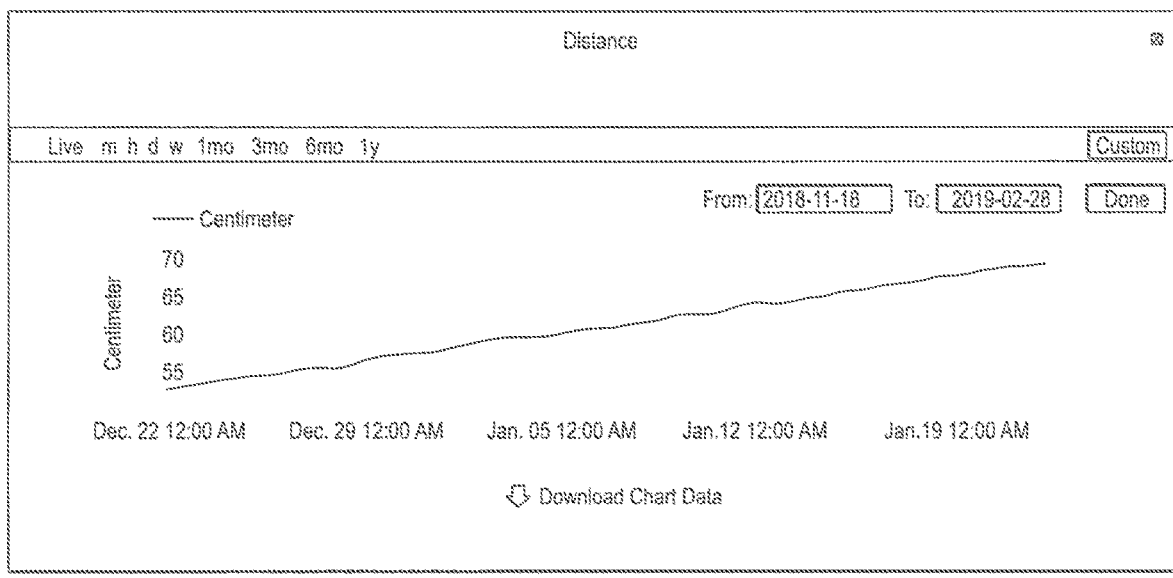
FIG. 10 is a screenshot of a graph in a web portal displaying data obtained using one exemplary embodiment.
Figure 11:
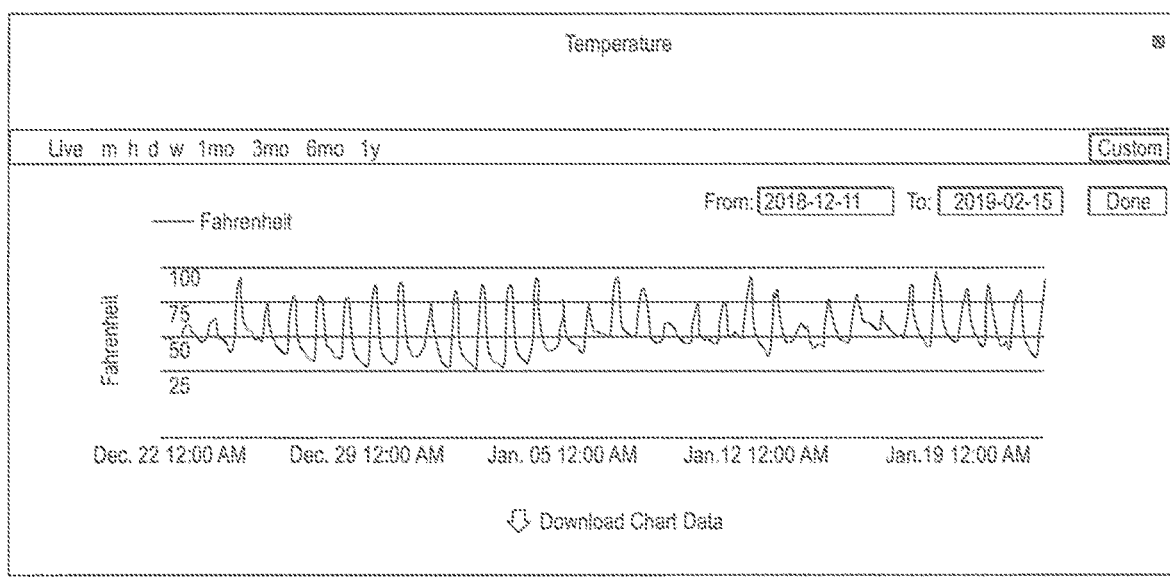
FIG. 11 is a screenshot of a graph in a web portal displaying data obtained using one exemplary embodiment.

Data from the lid devices 50 were obtained and monitored. FIG. 8 is a screenshot of a graphical user interface (GUI) in a web portal in an application server in which real time readings from a tank 1 are displayed. The GUI shown is a Cayenne™ platform (available from MyDevices Inc., Burbank, Calif.). As shown, the real time data being monitored were level (distance), temperature, and device metrics measuring the device signal, noise and power (i.e., decibel-milliwatts, decibels, percent battery life and battery voltage). (It is noted that such a GUI could alternatively be displayed on a mobile device application.) FIG. 9 is a screenshot of a detailed view of the real time data as delivered to the application server. FIG. 10 is a screenshot of a "30 trend line" graph of level data measured in centimeters every 30 minutes in the tank, illustrating that the fluid level is moving further from the sensor 36 over time. FIG. 11 is a screenshot of temperature data measured in degrees Fahrenheit every 30 minutes by a temperature sensor built into the bin monitor. It was observed from this data that the daytime highs were 30 to 40° higher than the ambient temperature.

Without wishing to be bound by theory, it is believed the black color of the lid caused the lid to absorb heat. In one embodiment, the lid 4 is white in color to reflect heat and avoid temperature spikes during periods of daylight.

Another GUI of a dashboard for monitoring the lid devices (not shown) can include data for individual tanks, including tank IDs, sensor IDs, the chemicals in the tanks, the chemical volumes, the percent fill levels, the measured distances, sensor/tank offsets, tank diameters and tank heights. The dashboard can include graphs of measured data and a map showing the locations of the devices being monitored.

It should be noted that only the components relevant to the disclosure are shown in the figures, and that many other components normally part of a system of chemical totes are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention. What is claimed is:

What is claimed is:

1. A device for wirelessly monitoring a container used for liquid storage, comprising:
   a. a lid configured to seal an opening of the container;
   b. a sensor integrated with the lid for obtaining data from the container;
   c. a lid transceiver integrated with the lid for receiving the data from the sensor and transmitting the data to a first gateway transceiver located at a remote location for aggregating data from multiple lid transceivers and relaying the aggregated data to a server on a low-power wide-area network in one or more packets, wherein the lid transceiver and the first gateway transceiver are configured to communicate over the low-power wide-area network using a radio frequency spectrum of from 30 to 300,000 MHz, wherein the data is selected from the group consisting of a liquid level, a lid position, a lid orientation, humidity data, temperature data, GPS coordinates, movement data and combinations thereof;
   d. a microcontroller integrated with the lid programmed with instructions for coordinating communications to and/or from the lid transceiver; and
   e. a source of power integrated with the lid for powering the sensor, the lid transceiver and the microcontroller.

2. The device of claim 1 wherein the sensor is selected from the group consisting of a noncontact ultrasonic sensor for measuring a liquid level in the container, a humidity sensor, a temperature sensor, a sensor for detecting GPS coordinates, an accelerometer for detecting movement of the lid, and combinations thereof.

3. The device of claim 1 wherein the source of power is selected from at least one battery connected to at least one of the group consisting of the sensor, the lid transceiver and the microcontroller and at least solar panel connected to at least one of the sensor, the lid transceiver and the microcontroller.

4. The device of claim 1 wherein the microcontroller is configured to receive instructions from the first gateway transceiver to the lid transceiver to actively control the device.

5. The device of claim 4 wherein the device further comprises a visual indicator to alert operators in close proximity to the device of a condition that requires attention.

6. The device of claim 4 wherein the sensor comprises an ultrasonic sensor capable of emitting an audible frequency perceptible by human operators; and the instructions cause the ultrasonic sensor to shift from an ultrasonic frequency to an audible frequency perceptible by human operators alert operators in close proximity to the device of a condition that requires attention.

7. The device of claim 1 wherein the lid further comprises a vent for allowing gas to escape from the container.

8. The device of claim 1 further comprising a scannable label on the device containing device identifying information such that when the label is scanned, the device identifying information is transmitted to a server for network onboarding of the device over the low-power wide-area network.

9. The device of claim 8 wherein the scannable label is selected from the group consisting of a quick response code label, a radio frequency identification tag and a barcode label.

10. The device of claim 8 wherein the device identifying information is selected from the group consisting of GPS coordinates of the device, dimensions of the container and combinations thereof.

11. The device of claim 1 further comprising a near field communication system integrated with the lid such that communication between the device and a paired mobile device is enabled when the device is proximate the paired mobile device.

12. The device of claim 1 wherein the lid transceiver is configured to transmit data from once per day to multiple times per hour.

13. The device of claim 1 wherein the lid is white in color to reflect heat.

14. A system for wirelessly monitoring a plurality of containers used for liquid storage, comprising:
   a. the plurality of containers located within a distance from one another of up to 25 miles, wherein each of the containers has the device of claim 1 configured to seal the opening of the container such that the plurality of containers has a plurality of lid transceivers corresponding thereto, respectively;
   b. a first gateway transceiver located at a remote location for aggregating data from multiple lid transceivers of the plurality of lid transceivers and relaying the aggregated data to a server on a low-power wide-area network in one or more packets; and
   c. the low-power wide-area network over which data can be relayed among the plurality of lid transceivers and between the first gateway transceiver;
   d. a second gateway transceiver and a third gateway transceiver for receiving data from the lid transceiver of each device wherein the first, second and third gateway transceivers have known, fixed locations and communicate with each other over the low-power wide-area network; and wherein the first, second and third gateway transceivers determine a location of a lid transceiver such that the lid transceiver of each device need not comprise a sensor for detecting GPS coordinates for the system to locate each device.

15. The system of claim 14, further comprising a pump for injecting the liquid stored in at least one of the plurality of containers injected into a target piece of equipment in a process that utilizes the liquid and a fluid conduit connected to the pump.

16. The system of claim 15, further comprising a pump controller for controlling operation of the pump.

17. The system of claim 14 wherein each of the plurality of containers have a capacity of from 0.5 to 1000 gallons.

18. The system of claim 14 wherein the low-power wide-area network has a data rate of from 0.3 kbit/s to 50 kbit/s per channel.

19. The system of claim 14 wherein the low-power wide-area network uses a radio frequency spectrum of from 300 to 3000 MHz.

20. The system of claim 14 further comprising a paired mobile device configured to communicate with the device using a near field communication system or a Bluetooth interface when the paired mobile device is proximate the device.

21. The system of claim 14 wherein the lid transceiver and the first gateway transceiver are configured to use spread spectrum techniques to enable recovery of the data at low signal levels and in a presence of noise.

22. A method for wirelessly monitoring a container used for liquid storage, comprising:
   a. sealing an opening in a wall of the container with a device configured to seal the opening, wherein the device comprises:
      i. a lid configured to seal the opening of the container;
      ii. a sensor integrated with the lid for obtaining data from the container;
      iii. a lid transceiver integrated with the lid for receiving the data from the sensor and transmitting the data to a first gateway transceiver located at a remote location for aggregating data from multiple lid transceivers and relaying the aggregated data to a server on a low-power wide-area network formed by the lid transceiver and the first gateway transceiver in one or more packets, wherein the lid transceiver and the first gateway transceiver are configured to communicate over the low-power wide-area network using a radio frequency spectrum of from 30 to 300,000 MHz;
      iv. a microcontroller integrated with the lid programmed with instructions for coordinating communications to and/or from the lid transceiver; and
      v. a source of power integrated with the lid for powering the sensor, the lid transceiver and the microcontroller;
   b. obtaining data from the container using the sensor, wherein the data is selected from the group consisting of a liquid level, a lid position, a lid orientation, humidity data, temperature data, GPS coordinates, movement data and combinations thereof;
   c. receiving the data from the sensor using the lid transceiver; and
   d. receiving the data from the lid transceiver using the first gateway transceiver located at the remote location.

23. The method of claim 22, further comprising replacing the device with a second device at the container by scanning a scannable label containing device identifying information and deactivating the device using a mobile device application on a mobile device; and scanning a second scannable label containing second device identifying information and activating the second device using the mobile device application; and sealing the opening in the wall of the container with the second device;
   wherein the second device comprises:
      a. a second lid configured to seal the opening of the container;
      b. a second sensor integrated with the second lid for obtaining data measured by the second sensor from the container;
      c. a second lid transceiver integrated with the second lid for receiving the data measured by the second sensor from the sensor and transmitting the data measured by the second sensor to the first gateway transceiver, wherein the second lid transceiver and the first gateway transceiver are configured to communicate over the low-power wide-area network using a radio frequency spectrum of from 30 to 300,000 MHz; and
      d. a second microcontroller integrated with the second lid programmed with instructions for coordinating communications to and/or from the second lid transceiver.

24. The method of claim 22 wherein the data is received by the first gateway transceiver at least once per day.

25. The method of claim 22 wherein the data received by the first gateway transceiver is stored in a timeseries data store for access by a user.

26. The method of claim 25 further comprising accessing the data in the timeseries data store to determine when to refill the container.

27. The method of claim 25 further comprising scheduling ordering the liquid to refill the container.

28. The method of claim 22 wherein the first gateway transceiver transmits instructions to the lid transceiver to actively control the device.

29. The method of claim 28 wherein the device further comprises a visual indicator to alert operators in close proximity to the device of a condition that requires attention; and the device is controlled to activate the visual indicator.

30. The method of claim 28 wherein the sensor comprises an ultrasonic sensor capable of emitting an audible frequency perceptible by human operators; and the instructions cause the ultrasonic sensor to shift from an ultrasonic frequency to an audible frequency perceptible by human operators alert operators in close proximity to the device of a condition that requires attention.

31. A method for retrofitting a container used for liquid storage to enable monitoring of the container, comprising:
   replacing a standard lid for sealing an opening of the container comprising no transceiver with the device of claim 1 configured to seal the opening of the container.

* * * * *